US009444881B2

(12) United States Patent
Huang

(10) Patent No.: US 9,444,881 B2
(45) Date of Patent: Sep. 13, 2016

(54) METHOD, SYSTEM, AND APPARATUS FOR EXCHANGING DATA BETWEEN CLIENT DEVICES

(71) Applicant: Tencent Technology (Shenzhen) Company Limited, Shenzhen, Guangdong Province (CN)

(72) Inventor: Tieming Huang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 13/898,403

(22) Filed: May 20, 2013

(65) Prior Publication Data

US 2013/0346563 A1 Dec. 26, 2013

(30) Foreign Application Priority Data

Jun. 20, 2012 (CN) .................. 2012 1 0204568

(51) Int. Cl.
| | |
|---|---|
| G06F 15/16 | (2006.01) |
| H04L 29/08 | (2006.01) |
| H04L 12/58 | (2006.01) |
| G06F 17/30 | (2006.01) |

(52) U.S. Cl.
CPC ........... *H04L 67/10* (2013.01); *G06F 17/3087* (2013.01); *G06F 17/30861* (2013.01);
(Continued)

(58) Field of Classification Search
CPC ....... H04L 67/10; H04L 67/18; H04L 67/22; H04L 67/104; H04L 41/50; G06F 13/14; G06F 13/387; G06F 17/30861
USPC .................. 455/445; 704/735; 705/27.2, 52; 707/10, 104.1; 709/202, 206, 219; 726/4
See application file for complete search history.

(56) References Cited

U.S. PATENT DOCUMENTS

| | | | | |
|---|---|---|---|---|
| 2002/0007350 A1* | 1/2002 | Yen | ................... | G06Q 30/0248 |
| | | | | 705/52 |
| 2003/0050959 A1* | 3/2003 | Faybishenko | ..... | G06F 17/30867 |
| | | | | 709/202 |

(Continued)

FOREIGN PATENT DOCUMENTS

| | | |
|---|---|---|
| CN | 101247364 A | 8/2008 |
| CN | 101674314 A | 3/2010 |

(Continued)

OTHER PUBLICATIONS

Tencent Technology, ISRWO, PCT/US2013/075929, Aug. 29, 2013, 8 pgs.

(Continued)

*Primary Examiner* — Joseph E Avellino
*Assistant Examiner* — Patrick Ngankam
(74) *Attorney, Agent, or Firm* — Morgan, Lewis & Bockius LLP

(57) ABSTRACT

Systems and methods for exchanging data between two client devices are disclosed. A method includes, at a computer system, obtaining, from a first client device, a first data acquisition request, wherein the first data acquisition request includes (i) a device identifier identifying a second client device distinct from the first client device, and (ii) a search parameter identifier; and identifying the second client device, from a plurality of client devices, in accordance with the device identifier. In some implementations, a method further includes, issuing a second data acquisition request to the second device, the second data acquisition request including the search parameter identifier; obtaining, from the second client device, a search parameter associated with the search parameter identifier; obtaining one or more search results associated with the search parameter; and providing at least one search result in the one or more search result to the first client device for display to a user of the first client device.

20 Claims, 14 Drawing Sheets

(52) U.S. Cl.
CPC ........... *H04L51/38* (2013.01); *G06F 17/3005* (2013.01); *G06F 17/30029* (2013.01); *G06F 17/3082* (2013.01)

(56) References Cited

U.S. PATENT DOCUMENTS

| | | | | |
|---|---|---|---|---|
| 2005/0278389 | A1* | 12/2005 | Maze | G06F 17/30215 |
| 2008/0098301 | A1* | 4/2008 | Black | H04L 67/1008 715/246 |
| 2009/0063235 | A1 | 3/2009 | Geng | |

FOREIGN PATENT DOCUMENTS

| | | |
|---|---|---|
| CN | 102355493 A | 2/2012 |
| CN | 102469112 A | 5/2012 |
| CN | 102710789 A | 10/2012 |
| JP | 2003115099 A | 4/2003 |
| JP | 2008085936 A | 4/2008 |
| JP | 2011066625 A | 3/2011 |
| KR | 20100096067 A | 9/2010 |
| RU | 2368945 C2 | 9/2009 |

OTHER PUBLICATIONS

Tencent Technology, IPRP, PCT/US2013/075929, Dec. 23, 2014, 6 pgs.

Tencent Technology, Examination Report, AU-2013280101, Mar. 24, 2015, 3 pgs.

Tencent Technology, Examination Report, NZ 700704, Apr. 14, 2015, 6 pgs.

\* cited by examiner

METHOD, SYSTEM, AND APPARATUS FOR EXCHANGING DATA BETWEEN CLIENT DEVICES

RELATED APPLICATION

This application claims priority to Chinese Patent Application No. 2012102045686, entitled "METHOD, SYSTEM, AND APPARATUS FOR EXCHANGING DATA BETWEEN CLIENT DEVICES," filed Jun. 20, 2012, which is incorporated by reference in its entirety.

TECHNICAL FIELD

The disclosed implementations relate generally to data exchange technologies, and in particular, to a method, system, and apparatus for exchanging data between client devices.

BACKGROUND

Conventionally two manners are adopted to transmit data from a wireless terminal (for example, a mobile phone) to a personal computer (PC). In a first manner, a user connects a PC to a wireless terminal using a data cable; and in a second manner, without using a data cable, a user first uploads data from the wireless terminal to a server and then acquires the data by submitting a download request from a PC to the server.

In the first manner, a user needs to plug and unplug a data cable each time, which is inconvenient, and in the second manner, a user needs to initiate a process including two requests to acquire data, which is also cumbersome.

SUMMARY

Accordingly, it is necessary to provide a method, system, and apparatus for exchanging data between client devices, which can implement data exchange between client devices in a simpler way.

Systems, methods, and non-transitory computer readable storage medium comprising instructions for exchanging data between two client devices are disclosed.

In some implementations, a method for exchanging data between two client devices, includes: at a computer system having a processor and memory for storing one or more programs to be executed by the processor, obtaining, from a first client device, a first data acquisition request, wherein the first data acquisition request includes (i) a device identifier identifying a second client device distinct from the first client device, and (ii) a search parameter identifier identifying a search parameter; identifying the second client device, from a plurality of client devices, in accordance with the device identifier; issuing a second data acquisition request to the second device, the second data acquisition request including the search parameter identifier; obtaining, from the second client device, a search parameter in accordance with the search parameter identifier; obtaining one or more search results in accordance with the search parameter; and providing at least one search result in the one or more search result to the first client device for display to a user of the first client device.

In some implementations, a computer system for exchanging data between two client devices is disclosed. In some implementations, the computer system comprises one or more processors; memory; and one or more programs. The one or more programs are stored in the memory and configured to be executed by the one or more processors. In some implementations, the one or more programs include instructions for: obtaining, from a first client device, a first data acquisition request, wherein the first data acquisition request includes (i) a device identifier identifying a second client device distinct from the first client device, and (ii) a search parameter identifier identifying a search parameter; identifying the second client device, from a plurality of client devices, in accordance with the device identifier; issuing a second data acquisition request to the second device, the second data acquisition request including the search parameter identifier; obtaining, from the second client device, a search parameter in accordance with the search parameter identifier; obtaining one or more search results in accordance with the search parameter; and providing at least one search result in the one or more search result to the first client device for display to a user of the first client device.

In some implementations, a non-transitory computer readable storage medium storing instructions for exchanging data between two client devices is disclosed. In some implementations, on-transitory computer readable storage medium stores one or more programs, the one or more programs comprising instructions, which when executed by a computer system with one or more processors, cause the computer system to: obtain, from a first client device, a first data acquisition request, wherein the first data acquisition request includes (i) a device identifier identifying a second client device distinct from the first client device, and (ii) a search parameter identifier identifying a search parameter; identify the second client device, from a plurality of client devices, in accordance with the device identifier; issue a second data acquisition request to the second device, the second data acquisition request including the search parameter identifier; obtain, from the second client device, a search parameter in accordance with the search parameter identifier; obtain one or more search results in accordance with the search parameter; and providing at least one search result in the one or more search result to the first client device for display to a user of the first client device.

Through the method, system, and apparatus for exchanging data between client devices, a process that a user accesses data in a second client device with a first client device is almost the same as a process that the user accesses data in the first client device, both requiring only one step of operation. Compared with the conventional data cable connection or upload and download, the operation process is simpler and use experience is smoother. To make the foregoing and other objectives, features, and advantages of the present application more comprehensible, exemplary implementations are taken in the following with reference to the accompanying drawings for detailed description.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

To further describe the technical measures and functions adopted by the present application for implementing the predetermined objectives, specific implementation manners, structures, features, and functions of the method, system, and apparatus for exchanging data between client devices according to the present application are described in detail in the following with reference to the drawings and exemplary implementations.

Figure 1:
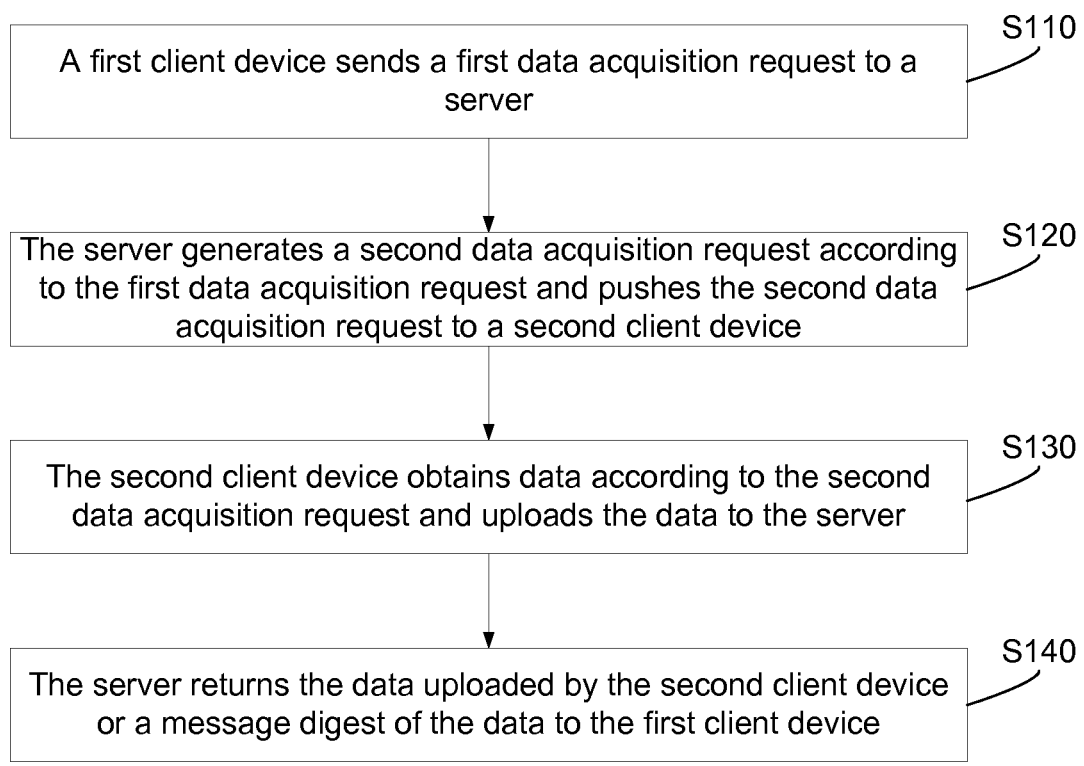
FIG. 1 is a flow chart of a method for exchanging data between client devices according to a first implementation of the present application.

FIG. 1 is a flow chart of a method for exchanging data between client devices according to a first implementation of the present application. The client device is, for example, a personal computer, a mobile phone, a tablet computer, and the like. As shown in FIG. 1, the method includes the following steps.

Step S110: A first client device sends a first data acquisition request to a server.

Step S120: The server generates a second data acquisition request according to the first data acquisition request, and pushes the second data acquisition request to a second client device.

Step S130: The second client device acquires data according to the second data acquisition request, and uploads the acquired data to the server.

Step S140: The server returns the data uploaded by second client device or a message digest of the data to the first client device.

Figure 2:
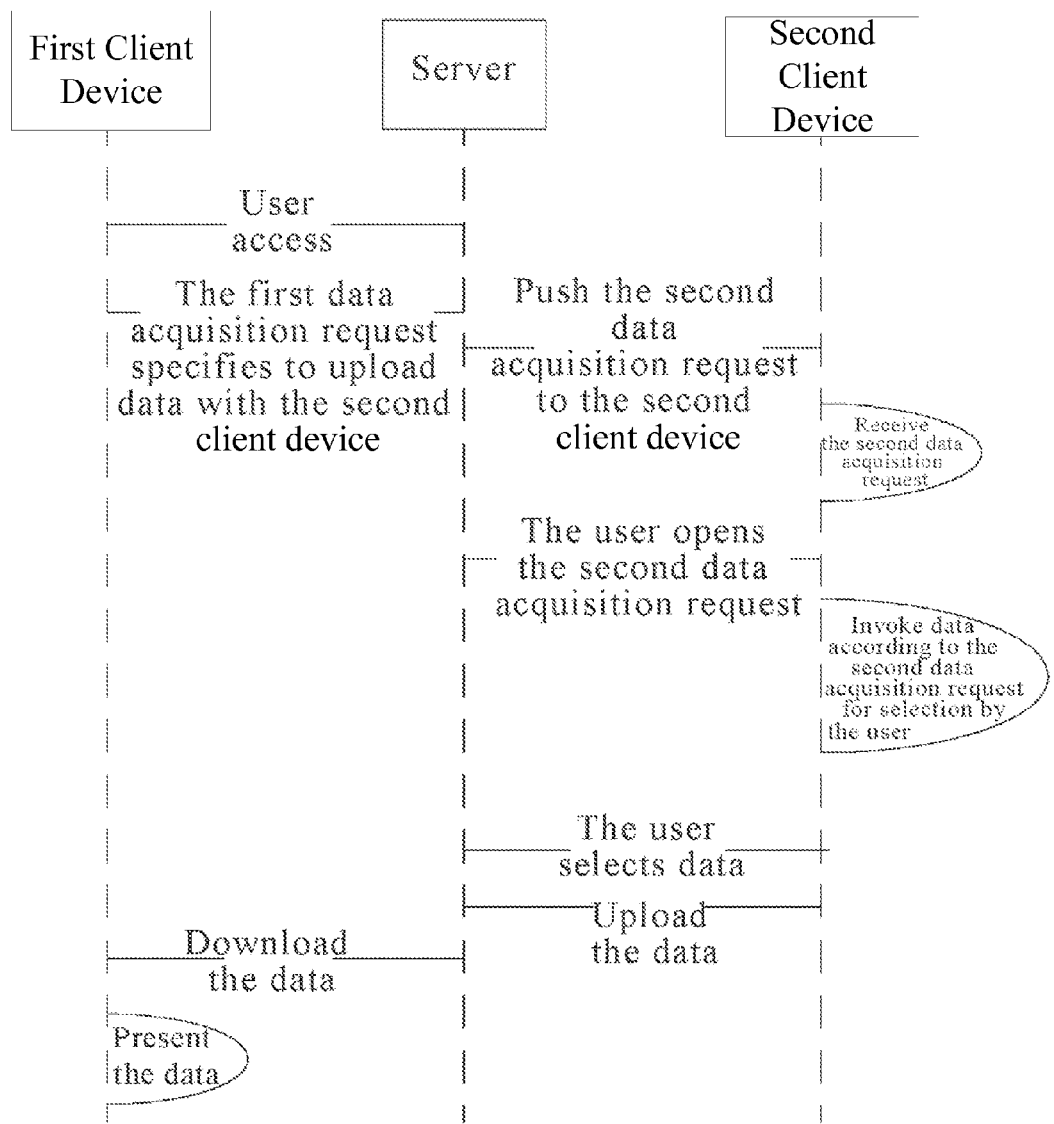
FIG. 2 is another flow chart of the method for exchanging data between client devices according to the first implementation of the present application.

For more detailed description, reference is further made to FIG. 2. FIG. 2 is a more detailed schematic diagram of the method for exchanging data between client devices shown in FIG. 1.

As shown in FIG. 2, before Step S110, the method, for example, further includes that a user accesses a network service provided by the server with the first client device. The network service is, for example, in various forms such as an email service, a social networking service such as microblogging (known as "weibo" in China), an electronic map service, an information search and retrieval service, an online shopping service, and a video-on-demand service. During the use of a network service, it may be required to perform a user authentication operation to authenticate the identity of a user.

When a user uses the network service, for example, retrieves, browses or publishes information, a user might need to use data in a second client device. The data, for example, includes an image, an audio file, a video file, a 2D barcode, and data generated during the use of an application. The data generated during the use of the application, for example, include breakpoint information of the application, geographical location information, and an interest point recoded during the use of an electronic map application. The breakpoint information is, for example, the time a video file or an audio file is played, a specific browsing position of a webpage with multiple pages or a browsing progress of an e-book. In other words, a format and a specific storage form of the data are not limited.

At this time, the user may select, in a page provided by the server, data in the second client device. Specifically, for example, the selection may be performed by selecting a particular entrance provided in a network service page. At this time, the first client device performs Step S110 to send a first data acquisition request to a server.

The first data acquisition request informs the server that data in the second client device needs to be acquired. The first data acquisition request may not explicitly specify the data to be acquired, but may specify a type of the data to be acquired. At this time, the data is determined by the second client device. In addition, the first data acquisition request may further directly specify the data to be acquired, for example, directly specify to acquire a photo taken recently or an audio file or a video file being played or to acquire data in real time. For example, the family members of a tourist visiting the Yellowstone National Park can use this technology to watch the park through the tourist's smartphone in real time. In another example, the parents of a teenager may use this method to prevent certain applications from being installed on the teenager's smartphone.

The server performs Step S120 after receiving the first data acquisition request. Specifically, in Step S120, the server may, for example, parse the first data acquisition request to acquire information such as the type of the data to be acquired and whether the data is specified. The type of the data includes, for example, an image, an audio file, a video file, a 2D barcode, and data generated during the use of an application. Next, the server generates a second data acquisition request according to the information such as the type of data to be acquired and whether the data is specified. The second data acquisition request conforms to a pre-defined format or is encapsulated by adopting a preset protocol.

Next, the server pushes the second data acquisition request to the second client device. A monitoring module is provided in the second client device and is configured to monitor the second data acquisition request pushed by the server. Multiple specific push manners may be adopted. For example, the second data acquisition request may be pushed to a mobile phone number through a short message, a multimedia message or service information, pushed to an email box, pushed to an instant messaging account, pushed to other application accounts or directly pushed to a network port monitored by the monitoring module.

Once the second data acquisition request is monitored by the monitoring module, data is acquired according to the second data acquisition request, namely, Step S130 starts to be performed. Specifically, when the second data acquisition request specifies the type of the data to be acquired and does not directly specify the data, the second client device may present, according to the second data acquisition request, data to be selected for selection by the user, for example, present an image library selection interface for the user to select an image or a music library selection interface for the user to select an audio file. When the second data acquisition request directly specifies the data to be acquired, for example, specifies a photo taken recently or an audio file being played, the corresponding photo or audio file may be directly acquired. The second data acquisition request may further require to acquire data in real time, for example, to record a sound segment, a video segment or a photo. At this time, the second client device correspondingly starts different data acquisition apparatuses, such as a microphone or a camera to acquire data input in real time. After acquiring the needed data, the second client device uploads the data to the server.

Next, Step S140 is performed. The server returns the data uploaded by the second client device or a message digest of the data to the first client device. The server may directly return, to a client, the data uploaded by the second client device, and the client outputs the data or further processes the data. The output includes, for example, to display an image or to play an audio file or a video file. The further processing is, for example, editing or forwarding. However, in some cases, the data uploaded by the second client device does not need to be returned to the first client device. For example, when the user uses an email service, the data uploaded by the second client device is directly taken as an attachment, and the first client device does not need to display the data, either. In this case, the server may generate a message digest, for example, a file name or a thumbnail of the data uploaded by the second client device, and return the generated message digest to the first client device, and the first client device displays the message digest, so that the user confirms that the corresponding data operation is completed.

To describe the method for exchanging data between client devices more specifically, a specific application example is introduced in the following with reference to FIG. 3.

The first client device is a personal computer (PC), the second client device is a smartphone used by the user, and an email client application runs on the smartphone. In addition, the email client application has an in-built monitoring module, configured to monitor an email conforming to a preset format, namely, the second data acquisition request.

The user accesses, through a browser that runs on the personal computer, the email service provided by the server, and to add a photo in editing a new email, it is selected to upload the photo with a smartphone. At this time, the server pushes the second data acquisition request to the email box of the user. Correspondingly, the second data acquisition request is monitored by the monitoring module in the email client application. At this time, the monitoring module invokes a photo selection interface for the user to select a photo to be uploaded. After the selection, the smartphone automatically uploads the selected image to the server. The server receives the uploaded image, and then returns the image to the personal computer and displays the image in the browser.

A specific application example of this implementation is introduced above in combination with email and a smartphone. The specific application scenario of this implementation is not limited to the email service above.

For example, in another application example, a user accesses, through a browser that runs on a personal computer, an online shopping service provided by the server, and during identity authentication, it is selected to upload a 2D barcode through the smartphone. At this time, the server pushes the second data acquisition request to a 2D barcode application that runs on the smartphone. Correspondingly, the second data acquisition request is monitored by a monitoring module in the 2D barcode application. At this time, the smartphone automatically uploads the 2D barcode to the server. The server receives the uploaded 2D barcode, and then returns the 2D barcode to the personal computer for identity authentication.

In addition, it may be understood that, it is not limited to that one same user uses the first client device and the second client device.

For example, in another application example, a first user accesses, through a browser that runs on a personal computer, a network service based on a geographical location and provided in the server, for example, to search for a restaurant or a hotel nearby. At a specified location, it is selected to perform upload with a smartphone used by a second user. At this time, the server pushes the second data acquisition request to the smartphone used by the second user. Correspondingly, the smartphone used by the second user automatically uploads the location information thereof to the server. The server receives the location information and then performs the search and returns a result to the personal computer used by the first user.

In addition, it is not limited to that a user accesses a network service provided by a server through a browser, either.

For example, in another application example, a user accesses a video-on-demand service through video-on-demand software, and when a video file to be played is specified, it is selected to continue playing based on the progress in a tablet computer. At this time, the server pushes the second data acquisition request to the tablet computer used by the user. The tablet computer records a resource locator and a play time of the video file being played by the tablet computer, and uploads the resource locator and the play time to the server. The server returns the resource locator and the play time to the video-on-demand software. At this time, the video-on-demand software may acquire a corresponding video file according to the resource locator and automatically locate to the progress in the tablet computer.

In the method for exchanging data between client devices, a process that a user accesses data in a second client device with a first client device is almost the same as a process that the user accesses data in the first client device, both requiring only one step of operation. Compared with the conventional data cable connection or upload and download, the operation process is simpler, and the use experience is smoother.

Figure 4:
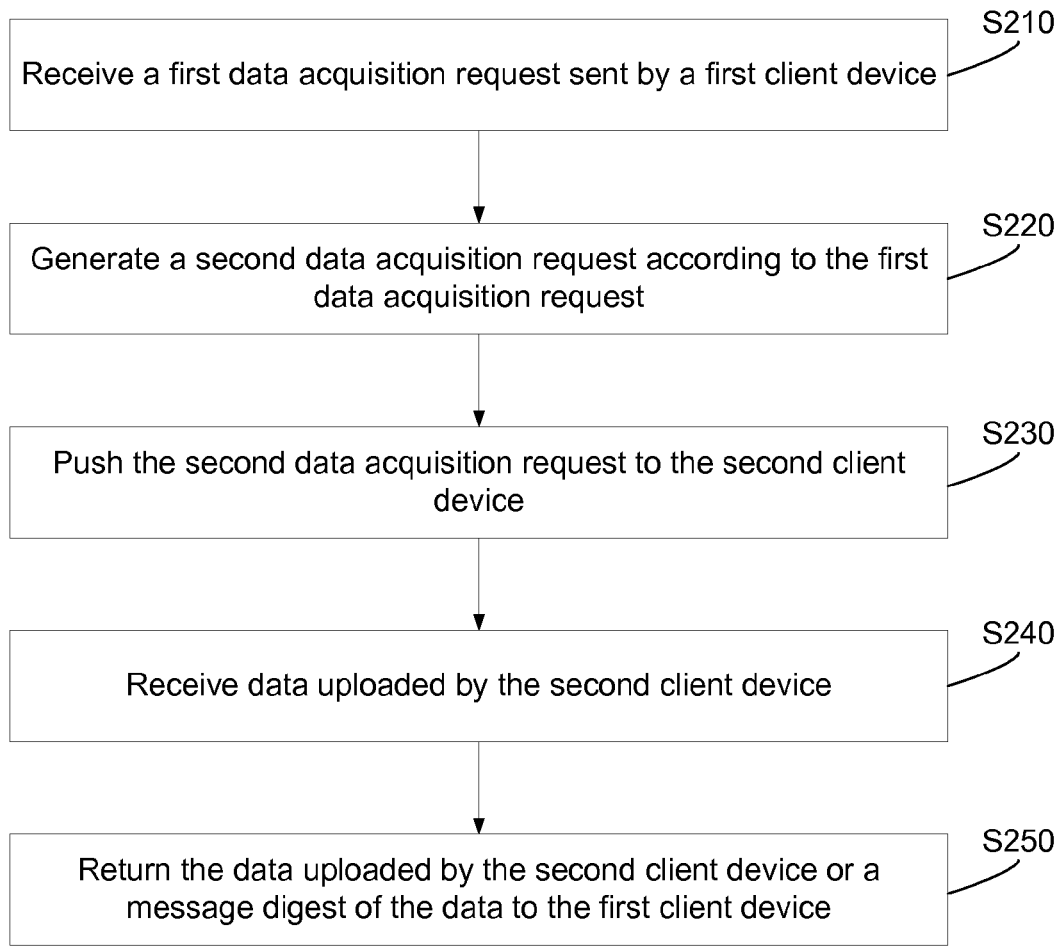
FIG. 4 is a flow chart of a method for exchanging data between client devices according to a second implementation of the present application.

FIG. 4 is a flow chart of a method for exchanging data between client devices according to a second implementation of the present application. The client device is, for example, a personal computer, a mobile phone, a tablet computer, and the like. The method is, for example, performed by a server providing a network service. As shown in FIG. 4, the method includes the following steps.

Step S210: Receive a first data acquisition request sent by a first client device, where the first data acquisition request informs the server that data needs to be uploaded with a second client device. The first data acquisition request may not explicitly specify the data to be acquired, and at this time, the data is determined by the second client device. In addition, the first data acquisition request may further directly specify the data to be acquired, for example, directly specify to acquire a photo taken recently or an audio file or a video file being played or to acquire data in real time.

Step S220: Generate a second data acquisition request according to the first data acquisition request, where the second data acquisition request is used for enabling the second client device to acquire and upload corresponding data.

Step S230: Push the second data acquisition request to the second client device. Multiple specific push manners may be adopted. For example, the second data acquisition request may be pushed to a mobile phone number through a short message, a multimedia message or service information, pushed to an email box, pushed to an instant messaging account or directly pushed to a network port monitored by a monitoring module.

Step S240: Receive data uploaded by the second client device.

Step S250: Return the data uploaded by the second client device or a message digest of the data to the first client device. The server may directly return, to a client, the data uploaded by the second client device, and the client outputs or further processes the data. The output includes, for example, to display an image or to play an audio file or a video file. The further processing is, for example, editing or forwarding. However, in some cases, the data uploaded by the second client device does not need to be returned to the first client device. For example, when a user uses an email service, the data uploaded by the second client device is directly taken as an attachment, and the first client device does not need to display the data, either. In this case, the server may generate a message digest, for example, a file name or a thumbnail of the data uploaded by the second client device, and return the generated message digest to the first client device, and the first client device displays the message digest, so that the user confirms that the corresponding data operation is completed.

Through the method for exchanging data between client devices of this implementation, a process that a user accesses data in a second client device with a first client device is almost the same as a process that the user accesses data in the first client device, both requiring only one step of operation. Compared with the conventional data cable connection or upload and download, the operation process is simpler, and the use experience is smoother.

Figure 5:
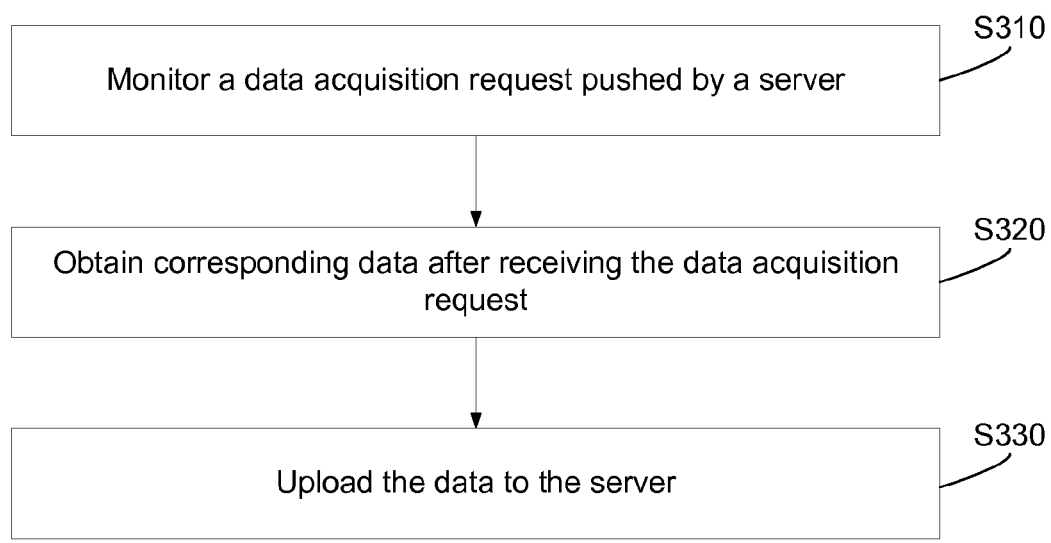
FIG. 5 is a flow chart of a method for exchanging data between client devices according to a third implementation of the present application.

FIG. 5 is a flow chart of a method for exchanging data between client devices according to a third implementation of the present application. The client device is, for example, a personal computer, a mobile phone, a tablet computer, and the like. As shown in FIG. 5, the method includes the following steps.

Step S310: Monitor a data acquisition request pushed by a server. Multiple specific push manners may be adopted. For example, the data acquisition request may be pushed to a mobile phone number through a short message, a multimedia message or service information, pushed to an email box, pushed to an instant messaging account or directly pushed to a specific network port. Therefore, in Step S310, different manners need to be adopted correspondingly. For example, it may be implemented by a monitoring module that runs independently or a monitoring module that runs depending on other applications.

Step S320: Acquire corresponding data after the data acquisition request is monitored. Specifically, when the data acquisition request specifies a type of data to be acquired and does not directly specify the data, data to be selected may be presented according to the data acquisition request for selection by a user. For example, an image library selection interface is presented for a user to select an image, or a music library selection interface is presented for a user to select an audio file. When the data acquisition request directly specifies the data to be acquired, for example, specifies a photo taken recently or an audio file being played, the corresponding photo or audio file may be directly acquired. The data acquisition request may further require to acquire data in real time, for example, to record a sound segment, a video segment or a photo. At this time, different data acquisition apparatuses, such as a microphone or a camera, are correspondingly started to acquire data input in real time.

Step S330: Upload the acquired data to the server.

In the method for exchanging data between client devices of this implementation, through monitoring the data acquisition request pushed by the server, the corresponding data may be uploaded to the server when necessary, and in combination with the processing process of a server, the operation process of accessing data in an client device of this implementation with other client devices is simpler, and the use experience is smoother.

Figure 6:
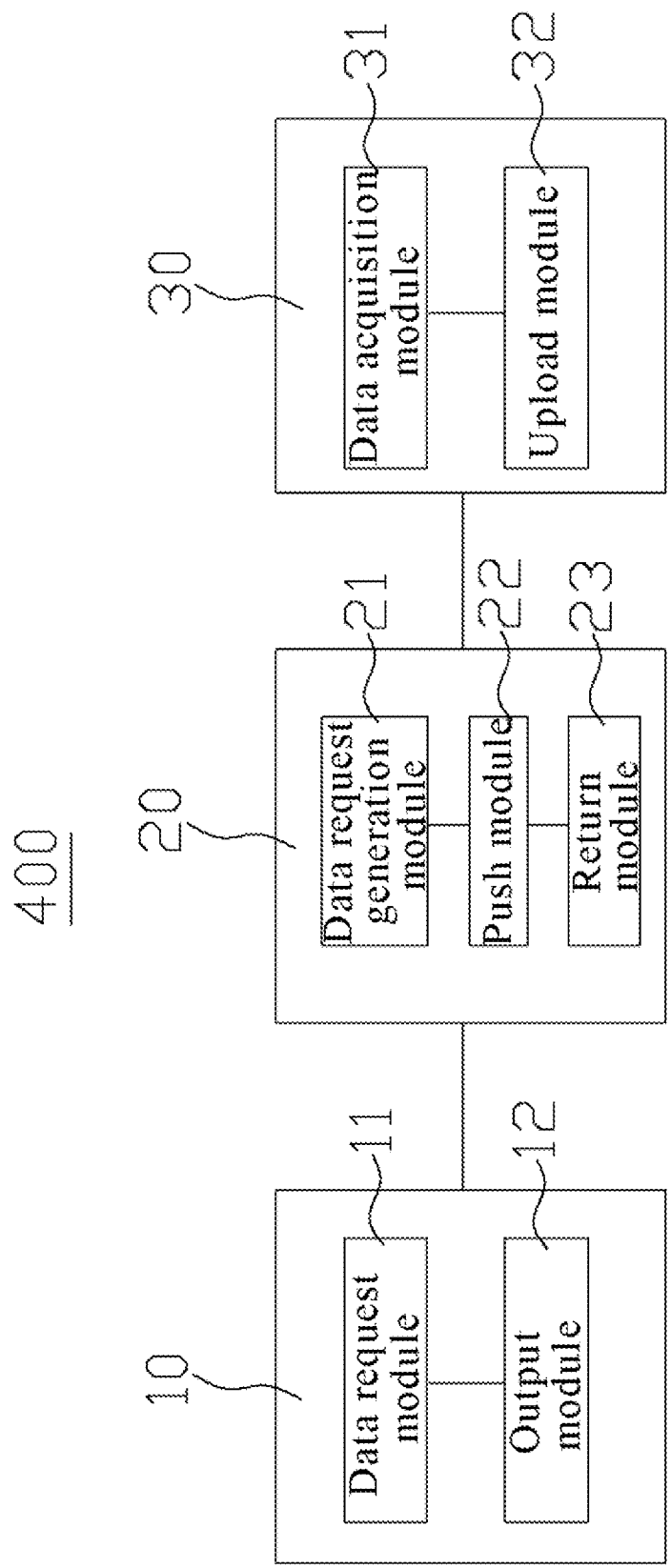
FIG. 6 is a structural block diagram of a system for exchanging data between client devices according to a fourth implementation of the present application.

FIG. 6 is a structural block diagram of a system for exchanging data between client devices according to a fourth implementation of the present application. As shown in FIG. 6, an exchange system 400 includes: a first client device 10, a server 20, and a second client device 30.

The first client device 10 includes: a data request module 11, configured to send a first data acquisition request to the server.

The server 20 includes: a data request generation module 21, configured to generate a second data acquisition request according to the first data acquisition request; and a push module 22, configured to push the second data acquisition request to the second client device.

The second client device 30 includes: a data acquisition module 31, configured to acquire data according to the second data acquisition request; and an upload module 32, configured to upload the acquired data to the server.

The data acquisition module 31 may, for example, include: a presentation unit 311 (referring to FIG. 8), configured to present, according to the second data acquisition request, data to be selected, and an acquisition unit 312 (referring to FIG. 8), configured to acquire selected data. In addition, the data acquisition module 31 may be configured to directly acquire corresponding data according to the specification in the second data acquisition request, and may further be configured to start a data acquisition apparatus in the second client device 30 to acquire data input in real time.

The server 20 further includes: a return module 23, configured to return the data uploaded by the second client device or a message digest of the data to the first client device.

The first client device 10 may further include: an output module 12, configured to display a result according to the data or the message digest of the data returned by the server.

Figure 3:
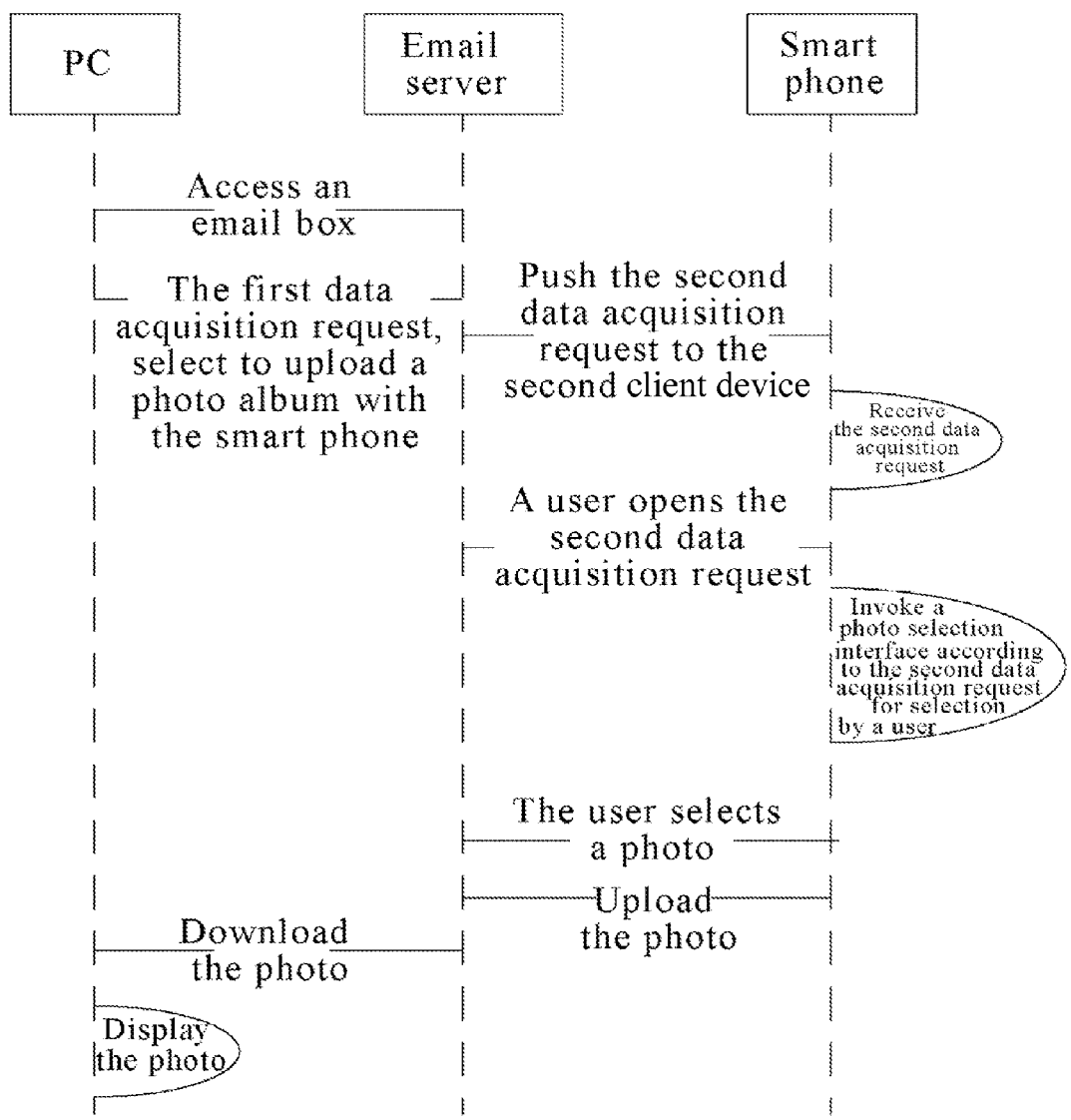
FIG. 3 is a schematic diagram of a specific application example of the method for exchanging data between client devices according to the first implementation of the present application.

For other details of the exchange system 400, reference may be further made to FIG. 1 to FIG. 3 and related description.

In the system for exchanging data between client devices of this implementation, a process that a user accesses data in a second client device with a first client device is almost the same as a process that the user accesses data in the first client device, both requiring only one step of operation. Compared with the conventional data cable connection or upload and download, the operation process is simpler, and the use experience is smoother.

Figure 7:
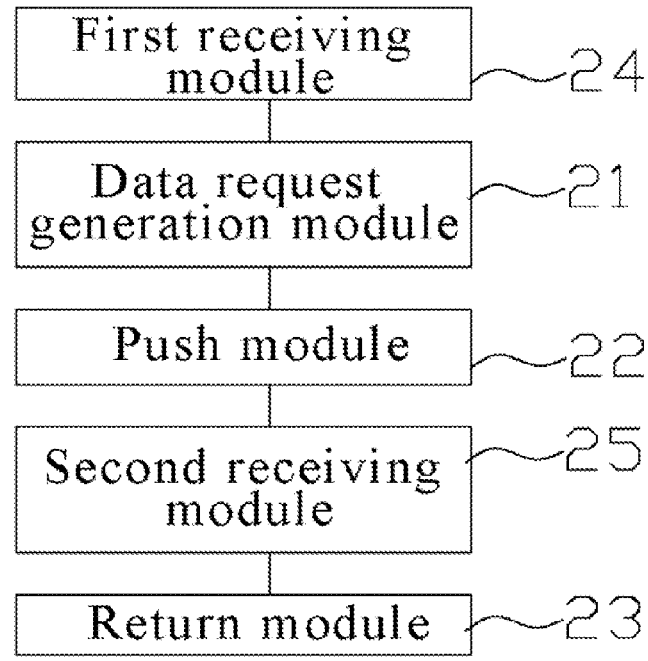
FIG. 7 is a structural block diagram of an apparatus for exchanging data between client devices according to a fifth implementation of the present application.

FIG. 7 is a structural block diagram of an apparatus for exchanging data between client devices according to a fifth implementation of the present application. As shown in FIG. 7, an exchange apparatus 20a includes a data request generation module 21, a push module 22, a return module 23, a first receiving module 24, and a second receiving module 25.

The data request generation module 21, the push module 22, and the return module 23 are the same as those in the fourth implementation, and reference may be made together.

The first receiving module 24 is configured to receive a first data acquisition request sent by the first client device; the data request generation module 21 is configured to generate a second data acquisition request according to the first data acquisition request, where the second data acquisition request is used for enabling a second client device to acquire and upload corresponding data; the push module 22 is configured to push the second data acquisition request to the second client device; the second receiving module 25 is configured to receive data uploaded by the second client device; and the return module 23 is configured to return the data uploaded by the second client device or a message digest of the data to the first client device.

For more details of the exchange apparatus 20a, reference may be further made to FIG. 4 and related description.

Through the apparatus for exchanging data between client devices of this implementation, a process that a user accesses data in a second client device with a first client device is almost the same as a process that the user accesses data in the first client device, both requiring only one step of operation. Compared with the conventional data cable connection or upload and download, the operation process is simpler, and the use experience is smoother.

Figure 8:
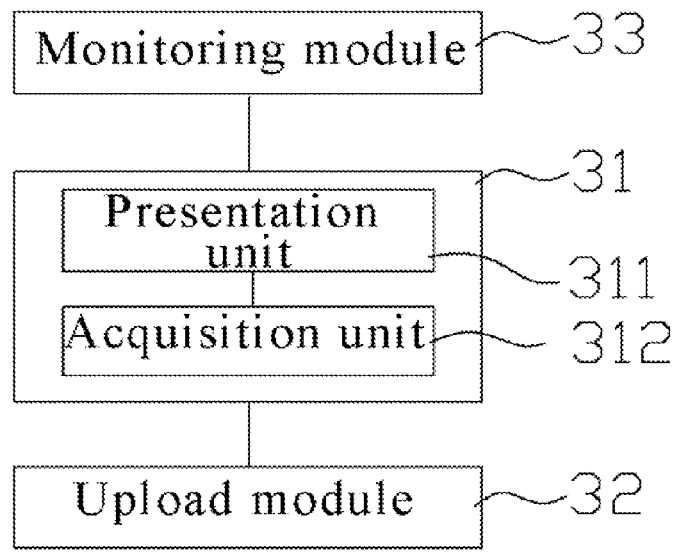
FIG. 8 is a structural block diagram of an apparatus for exchanging data between client devices according to a sixth implementation of the present application.

FIG. 8 is a structural block diagram of an apparatus for exchanging data between client devices according to a sixth implementation of the present application. As shown in FIG. 8, an exchange apparatus 30a includes: a data acquisition module 31, an upload module 32, and a monitoring module 33.

The data acquisition module 31 and the upload module 32 are the same as those in the fourth implementation, and reference may be made together.

The monitoring module 33 is configured to monitor a data acquisition request pushed by a server; a data acquisition module 31 is configured to acquire corresponding data after the data acquisition request is monitored by the monitoring module, and the upload module 32 is configured to upload the acquired data to the server.

The data acquisition module 31 may, for example, include: a presentation unit 311, configured to present, according to the second data acquisition request, data to be selected, and an acquisition unit 312, configured to acquire selected data. In addition, the data acquisition module 31 may be configured to directly acquire corresponding data according to the specification in the second data acquisition request, and may further be configured to start a data acquisition apparatus in the second client device 30 to acquire data input in real time.

In the apparatus for exchanging data between client devices of this implementation, through monitoring the data acquisition request pushed by the server, the corresponding data may be uploaded to the server when necessary, and in combination with the exchange apparatus in the fifth implementation, the operation process of accessing data in the exchange apparatus of this implementation with other client devices is simpler, and the use experience is smoother.

In addition, an implementation of the present application further provides a computer readable storage medium, which stores a computer executable instruction. The computer readable storage medium is, for example, a non-volatile memory such as an optical disk, a hard disk, or a flash memory.

The computer executable instruction is used for enabling a computer or a similar operational apparatus to perform the follow operations.

A first client device sends a first data acquisition request to a server.

The server generates a second data acquisition request according to the first data acquisition request, and pushes the second data acquisition request to a second client device.

The second client device acquires data according to the second data acquisition request, and uploads the acquired data to the server.

The server returns the data uploaded by the second client device or a message digest of the data to the first client device.

Furthermore, the first client device displays a result according to the data uploaded by the second client device or the message digest of the data.

Furthermore, that the second client device acquires data according to the second data acquisition request includes: presenting, according to the second data acquisition request, data to be selected, and acquiring selected data.

Furthermore, that the second client device acquires data according to the second data acquisition request includes: directly acquiring corresponding data according to the specification in the second data acquisition request.

Furthermore, that the second client device acquires data according to the second data acquisition request includes: starting a data acquisition apparatus in the second client device to acquire data input in real time.

The computer executable instruction is further used for enabling a computer or a similar operational apparatus to perform the follow operations.

Receive a first data acquisition request sent by a first client device.

Generate a second data acquisition request according to the first data acquisition request, where the second data acquisition request is used for enabling a second client device to acquire and upload corresponding data.

Push the second data acquisition request to the second client device.

Receive data uploaded by the second client device.

Return the data uploaded by the second client device or a message digest of the data to the first client device.

Furthermore, the second data acquisition request directly specifies data in the second client device.

The computer executable instruction is further used for enabling a computer or a similar operational apparatus to perform the follow operations.

Monitor a data acquisition request pushed by a server.

Obtain corresponding data after the data acquisition request is monitored.

Upload the acquired data to the server.

Furthermore, the acquiring corresponding data after the data acquisition request is monitored includes: presenting, according to the data acquisition request, data to be selected, and acquiring selected data.

Furthermore, the acquiring corresponding data after the data acquisition request is monitored includes: directly acquiring data according to the specification in the data acquisition request.

Furthermore, the acquiring corresponding data after the data acquisition request is monitored includes: starting a data acquisition apparatus in the client device to acquire data input in real time.

Figure 9:
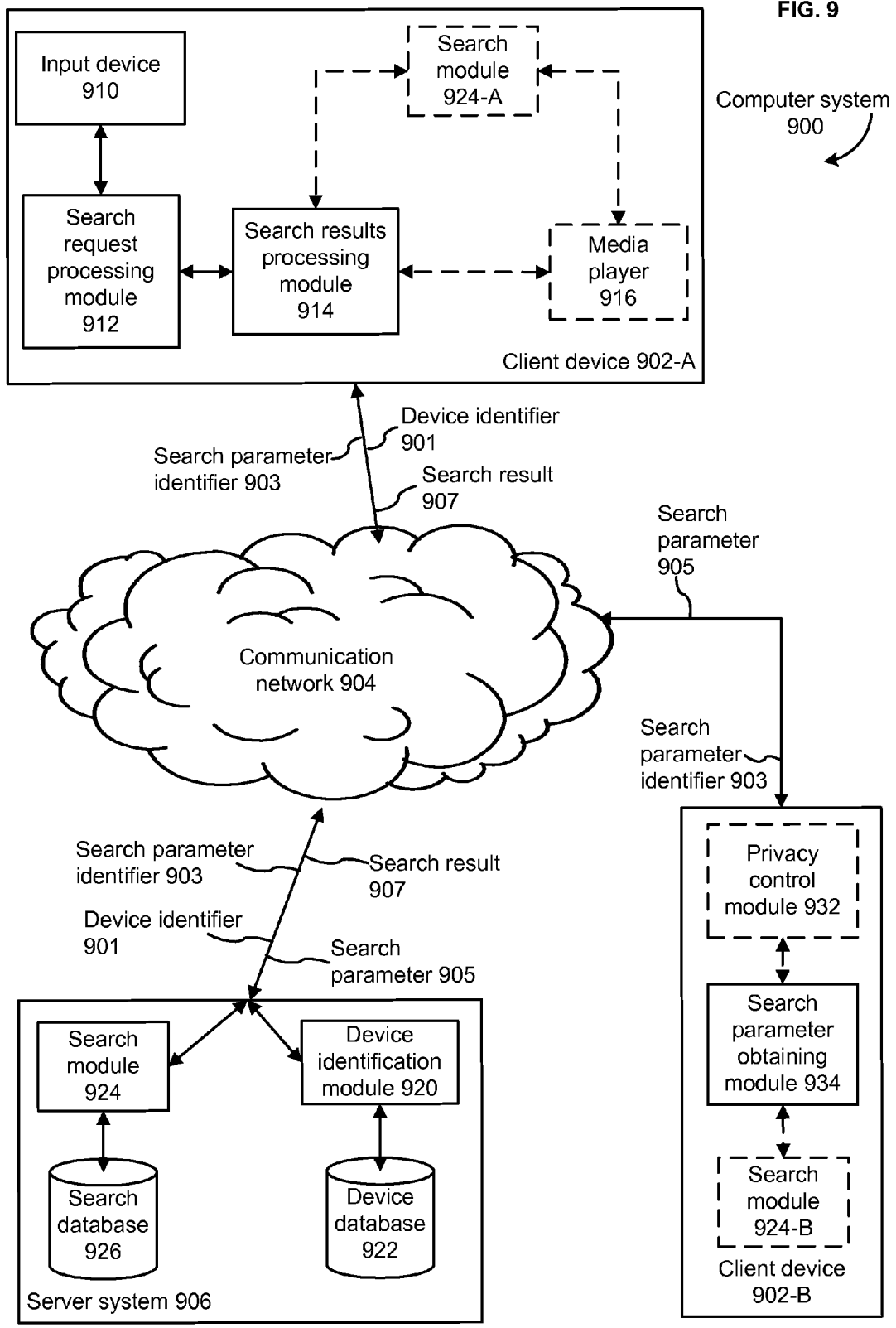
FIG. 9 is a block diagram illustrating a computer system, in accordance with some implementations.

FIG. 9 is a block diagram illustrating a computer system 900, in accordance with some implementations. The computer system 900 includes a client device 902-A, a communication network 904, a server system 906, and a client device 902-B.

The client device 902-A includes an input device 910, a search request processing module 912, a search results processing module 914, optionally a search module 924-A, and optionally a media player 916. As described below in connection with FIG. 12, the search module 924-A in the client device 902-A is optional if the client device 902-A receives the search results from the search module 924 in the server system 906. The one or more user input devices 910 include a keyboard, a mouse, a trackpad, and a touchscreen. The search request processing module 912 determines and issues data acquisition request to the server 906 in accordance with a user input (e.g., a user-selected search parameter. e.g., the search parameter identifier 903, or a user-specified device identifier, e.g., the device identifier 901). The optional search module 924-A generates search results in accordance with a search parameter (e.g., the search parameter 905) obtained from the server 906 or from the client device 902-B. The search results processing module 914 selectively obtains (e.g., filters), and presents (e.g., displays and formats) search results generated by the client device 902-A, or those received from the server 906. In some implementations, the optional media player 916 displays media content (e.g., a YOUTUBE or YOUKU video, or MP3 songs) included in a search result.

In some implementations, the communication network 904 is a computing cloud. The communication network 904 optionally includes the Internet, one or more local area networks (LANs), one or more wide area networks (WANs), other types of networks, or a combination of such networks.

In some implementations, the server system 906 includes a device identification module 920, a device database 922, a search module 924, and a search database 926. The device identification module 920 uniquely identifies a device (e.g. client 902-B) among a set of devices, in accordance with the device identifier 901. The device database 922 stores information (e.g., cell phone numbers, email addresses, SIM card numbers, IMEI numbers, MAC address, and device serial numbers) corresponding to a set of devices (e.g., cell phones, tablets, and smartphones, such as APPLE IPADs or IPHONEs). The search module 924 generates search results (e.g., nearby hotel or restaurant information) in accordance with a search parameter obtained from the client device 902-B (e.g., location of the client 902-B).

In some implementations, the search database 926 stores searchable information (e.g., hotel addresses, video or audio files, restaurant menus, and phone numbers), or indices thereof. In some implementations, the search database 926 is the Internet, of a portion thereof (e.g., content under a specific domain, such as "Baidu.com," "SOHU.com," or "Yahoo.com.cn").

In some implementations, the client device 902-B includes a privacy control module 930, a search parameter obtaining module 934, and a search module 924-B. The privacy control module 932 controls access to one or more search parameters stored on, generated by, or obtainable from, the client 902-B (e.g., location or altitude of the client 902-B, user activity history, browsing history of a user of the client 902-B), in accordance with one or more privacy settings. For example, in response to a request for certain information generated by the client device 902-B, the privacy control module 932 is triggered to display the request and associated information (e.g., from whom or which client device the request comes from) on its display. The client device 902-B does not send the requested information until after receiving an approval from the user of the client device 902-B.

Sometimes, it is necessary for one user to access information relating to another user. For example, a housewife, who sits in front of a desktop at home, may be interested in booking a hotel for her husband who has a smartphone and is currently on a cross-country road trip from New York City to San Francisco. In this case, the wife needs to know the current location of the husband without disrupting him. The search parameter obtaining module 934 obtains a search parameter in accordance with a search parameter identifier (e.g., obtaining location of the client 902-B in accordance with a location identifier included in a data acquisition request). In some implementations, the search module 924-B generates search results in accordance with a search parameter (e.g., nearby hotel or restaurant locations near the location of the client 902-B) obtained from the search parameter obtaining module 934.

Figure 10:
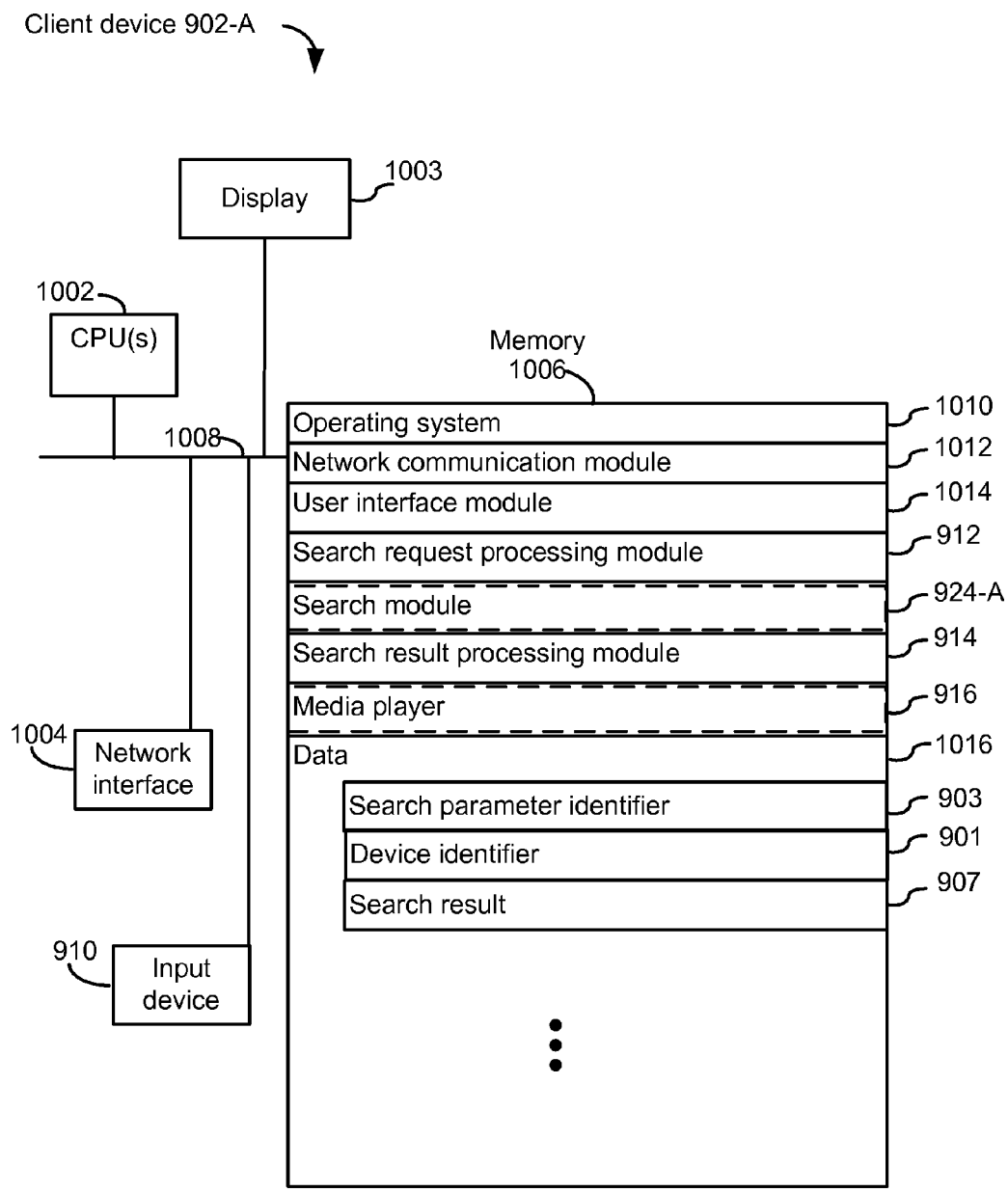
FIGS. 10-11 are block diagrams illustrating example client devices in accordance with some implementations.

FIG. 10 is a block diagram illustrating a first client device (e.g., the client device 902-A), in accordance with some implementations. The client device 902-A, in some implementations, includes one or more processing units CPU(s) 1002 (also herein referred to as processors), one or more network interfaces 1004, one or more input devices 910, memory 1006, a display 1003, and one or more communication buses 1008 for interconnecting these components. The communication buses 1008 optionally include circuitry (sometimes called a chipset) that interconnects and controls communications between system components. The memory 1006 typically includes high-speed random access memory, such as DRAM, SRAM, or other random access solid state memory devices; and optionally includes non-volatile memory, such as one or more magnetic disk storage devices, optical disk storage devices, flash memory devices, or other non-volatile solid state storage devices. The memory 1006 optionally includes one or more storage devices remotely located from the CPU(s) 1002. The memory 1006 or alternatively the non-volatile memory device(s) within the memory 1006, comprises a non-transitory computer readable storage medium. In some implementations, the memory 1006 or alternatively the non-transitory computer readable storage medium stores the following programs, modules and data structures, or a subset thereof:

- an operating system 1010, which includes procedures for handling various basic system services and for performing hardware dependent tasks;
- a network communication module (or instructions) 1012 for connecting the client device 902-A with other devices (e.g., the server 906 or the client device 902-B) via one or more network interfaces 1004 (wired or wireless), or the communication network 904 (FIG. 9);
- a user interface module 1014 for displaying different user interface controls (e.g., textboxes or dropdown lists for entering search parameter identifiers and device identifiers) as well as user data (e.g., search results) in accordance with user input;

a search request processing module 912 for generating and issuing one or more data acquisition requests to the server 906, in accordance with a user input (e.g., a user-selected search parameter or device identifier);

optionally, a search module 924 for generating search results in accordance with a search parameter (e.g., received from the server 906 or from the client device 902-B);

a search results processing module 914 for selective obtaining (e.g., filtering) or presenting (e.g., displaying and formatting thereof) search results generated by the client device 902-A and those received from the server 906;

optionally, a media player 916 for display media content included in a search result (e.g., a YOUTUBE or YOUKU video, MP3 songs); and data 1016 stored on the client device 902-A, which include:
a device identifier 901 for uniquely identifying a device from several devices;
a search parameter identifier 903 for uniquely identifying a search parameter from several parameters; and
one or more search results 901 obtained in response to a data acquisition request issued by a user.

In some implementations, the one or more user input devices 910 include a keyboard, a mouse, a trackpad, and a touchscreen.

Figure 11:
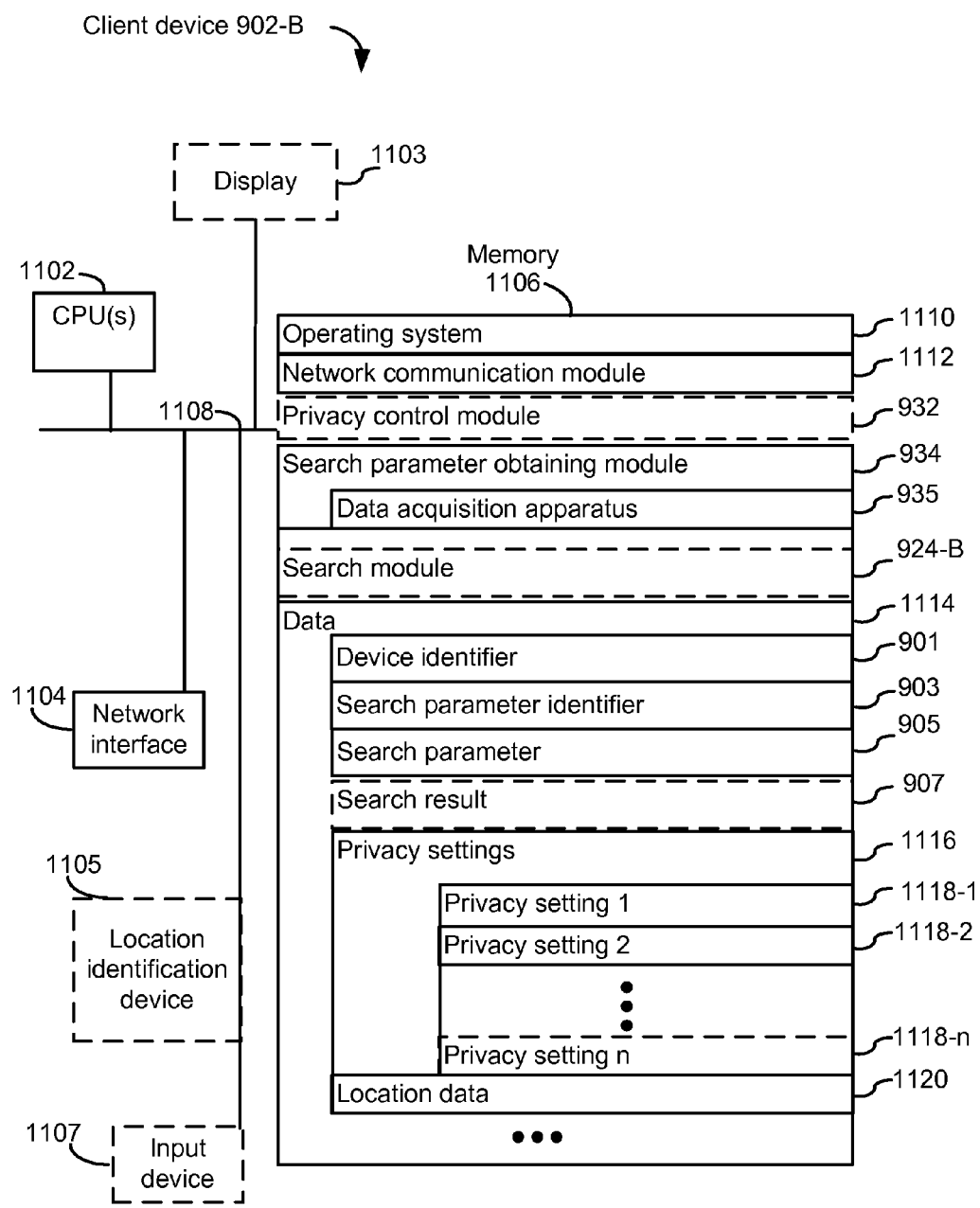

FIG. 11 is a block diagram illustrating a second client device (e.g., client device 902-B), in accordance with some implementations. The client device 902-A, in some implementations, includes one or more processing units CPU(s) 1902 (also herein referred to as processors, one or more network interfaces 1104, a location identification device 1105 (e.g., a GPS), one or more input devices 1107, memory 1106, a display 1103, and one or more communication buses 1108 for interconnecting these components. The communication buses 1108 optionally include circuitry (sometimes called a chipset) that interconnects and controls communications between system components. The memory 1106 typically includes high-speed random access memory, such as DRAM, SRAM, or other random access solid state memory devices; and optionally includes non-volatile memory, such as one or more magnetic disk storage devices, optical disk storage devices, flash memory devices, or other non-volatile solid state storage devices. The memory 1106 optionally includes one or more storage devices remotely located from the CPU(s) 1902. The memory 1106 or alternatively the non-volatile memory device(s) within the memory 1106, comprises a non-transitory computer readable storage medium. In some implementations, the memory 1106 or alternatively the non-transitory computer readable storage medium stores the following programs, modules and data structures, or a subset thereof:

an operating system 1110, which includes procedures for handling various basic system services and for performing hardware dependent tasks;

a network communication module (or instructions) 1112 for connecting the client device 902-B with other devices (e.g., the server 906 or the client device 902-A) via one or more network interfaces 1104 (wired or wireless), or the communication network 904 (FIG. 9);

a privacy control module 932 for controlling access to search parameters stored on, generated by, or obtainable from the client 902-B (e.g., location or altitude of the client 902-B, user activity history, browsing history of a user of the client 902-B) in accordance with one or more privacy settings (privacy settings 1118-1 . . . 1118-$n$);

a search parameter obtaining module 934 for obtaining a search parameter in accordance with a search parameter identifier, e.g., obtaining location (e.g., San Francisco, Calif.) of the client 902-B by invoking a data acquisition apparatus 935 (e.g., a GPS module) in the client 902-B in accordance with a location identifier (e.g., a string "LOCATION");

optionally, a search module 924-B for generating or otherwise obtaining search results in accordance with a search parameter (e.g., hotel or restaurant addresses near the location of the client 902-B); and data 1114 stored on the client device 902-B, which include:
a device identifier 901 for uniquely identifying a device from several devices;
a search parameter identifier 903 for uniquely identifying a search parameter 905 from several parameters;
one or more search results 907 obtained in response to a data acquisition request issued by a user; and
one or more privacy settings 1116 (1118-1 . . . 1118-$n$) for specifying access privileges (e.g., restricts or enables write or read access to), or a degree thereof, assigned to other devices (e.g., client 902-A or the server 906) when accessing one or more search parameters stored on, generated by, or otherwise obtainable from the 902-B; and
location data 1120 for identifying an approximate or exact location of the client device 906-B with various levels of precision (e.g., 11 Main street, Palo Alto, Calif. 94306, when a street level location is desired, or Palo Alto, Calif., when a city level location is desired).

In some implementations, the location identification device 1105 includes a GPS, an altitude sensor, and a high precision compass. In some implementations, the one or more user input devices 1107 include a keyboard, a mouse, a trackpad, and a touchscreen.

Figure 12:
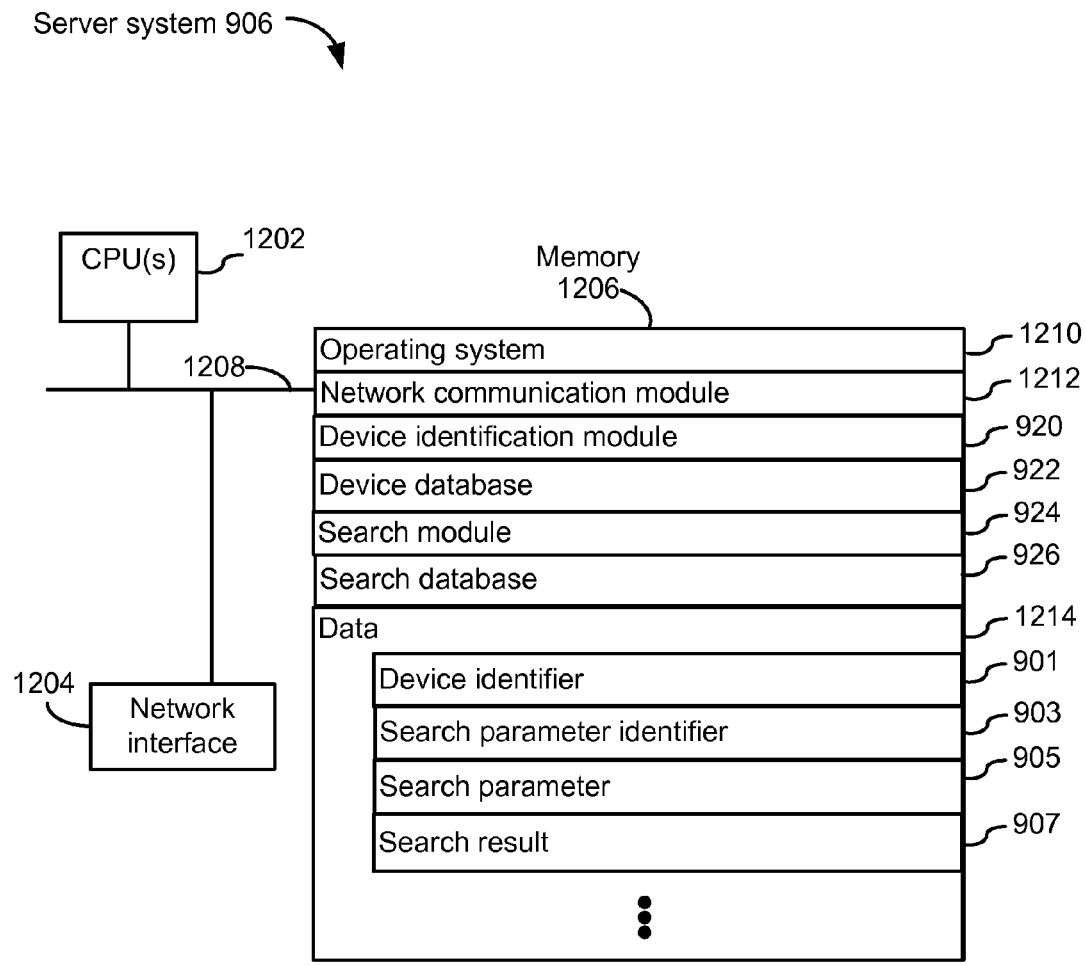
FIG. 12 is a block diagram illustrating an example server system, in accordance with some implementations.

FIG. 12 is a block diagram illustrating a server system (e.g., the server 906), in accordance with some implementations. The server 906, in some implementations, includes one or more processing units CPU(s) 1202 (also herein referred to as processors, one or more network interfaces 1204, one or more input devices 1204, memory 1206, and one or more communication buses 1208 for interconnecting these components. The communication buses 1208 optionally include circuitry (sometimes called a chipset) that interconnects and controls communications between system components. The memory 1206 typically includes high-speed random access memory, such as DRAM, SRAM, or other random access solid state memory devices; and optionally includes non-volatile memory, such as one or more magnetic disk storage devices, optical disk storage devices, flash memory devices, or other non-volatile solid state storage devices. The memory 1206 optionally includes one or more storage devices remotely located from the CPU(s) 1202. The memory 1206 or alternatively the non-volatile memory device(s) within the memory 1206, comprises a non-transitory computer readable storage medium. In some implementations, the memory 1206 or alternatively the non-transitory computer readable storage medium stores the following programs, modules and data structures, or a subset thereof:

- an operating system 1210, which includes procedures for handling various basic system services and for performing hardware dependent tasks;
- a network communication module (or instructions) 1212 for connecting the server 906 with other devices (e.g., the client devices 902-A and 902-B) via one or more network interfaces 1204 (wired or wireless), or the communication network 904 (FIG. 9);
- a device identification module for uniquely identifying a device (e.g. the client 902-B, which is a cell phone) among a set or collection of devices (e.g., a large number of cell phones), in accordance with a device identifier;
- a device database 922 for storing information (e.g., cell phone numbers, email addresses, SIM card numbers, IMEI numbers, MAC address, and device serial numbers), or indices thereof, corresponding to a set of devices (e.g., cell phones, tablets, and smartphones, such as APPLE IPADs or IPHONEs);
- a search module 924 for generating or obtaining search results (e.g., nearby COSTCO warehouse locations and hours) in accordance with a search parameter (e.g., in the city of Palo Alto, Calif., which is the client 902-B is currently located);
- a search database 926 for including searchable information (e.g., hotel addresses, video or audio files, restaurant menus, phone numbers, and attorney directories), or indices thereof; in some implementations, the search database 926 is the Internet, of a portion thereof (e.g., content under a specific domain, such as "Baidu.com," "SOHU.com," or "Yahoo.com.cn"); and
- data 1214 stored on the client device 902-B, which include:
  - a device identifier 901 (e.g., a SIM card number, an IMEI number, a cell phone number, a device name, a user name, a manufacturer-made device serial number) for uniquely identifying a particular client device, among several devices;
  - a search parameter identifier 903 for uniquely identifying a search parameter (e.g., location) from several parameters (e.g., location, time, pricing, and availability information of several hotels);
  - a search parameter 905 for specifying which search results are most relevant to or desired by a user; and
  - one or more search results 907 retrieved (e.g., from the search database 926, from the Internet or a portion thereof, or from a user specified network location, internal or external) in accordance with the search parameter 905.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 1006, 1106, or 1206 optionally stores a subset of the modules and data structures identified above. Furthermore, the memory 1006, 1106, or 1206 may store additional modules and data structures not described above.

Although FIG. 12 shows a "server system 906," also referred to as a server, FIG. 12 is intended more as functional description of the various features which may be present in server system than as a structural schematic of the implementations described herein. In practice, and as recognized by those of ordinary skill in the art, items shown separately could be combined and some items could be separated.

Figure 13:
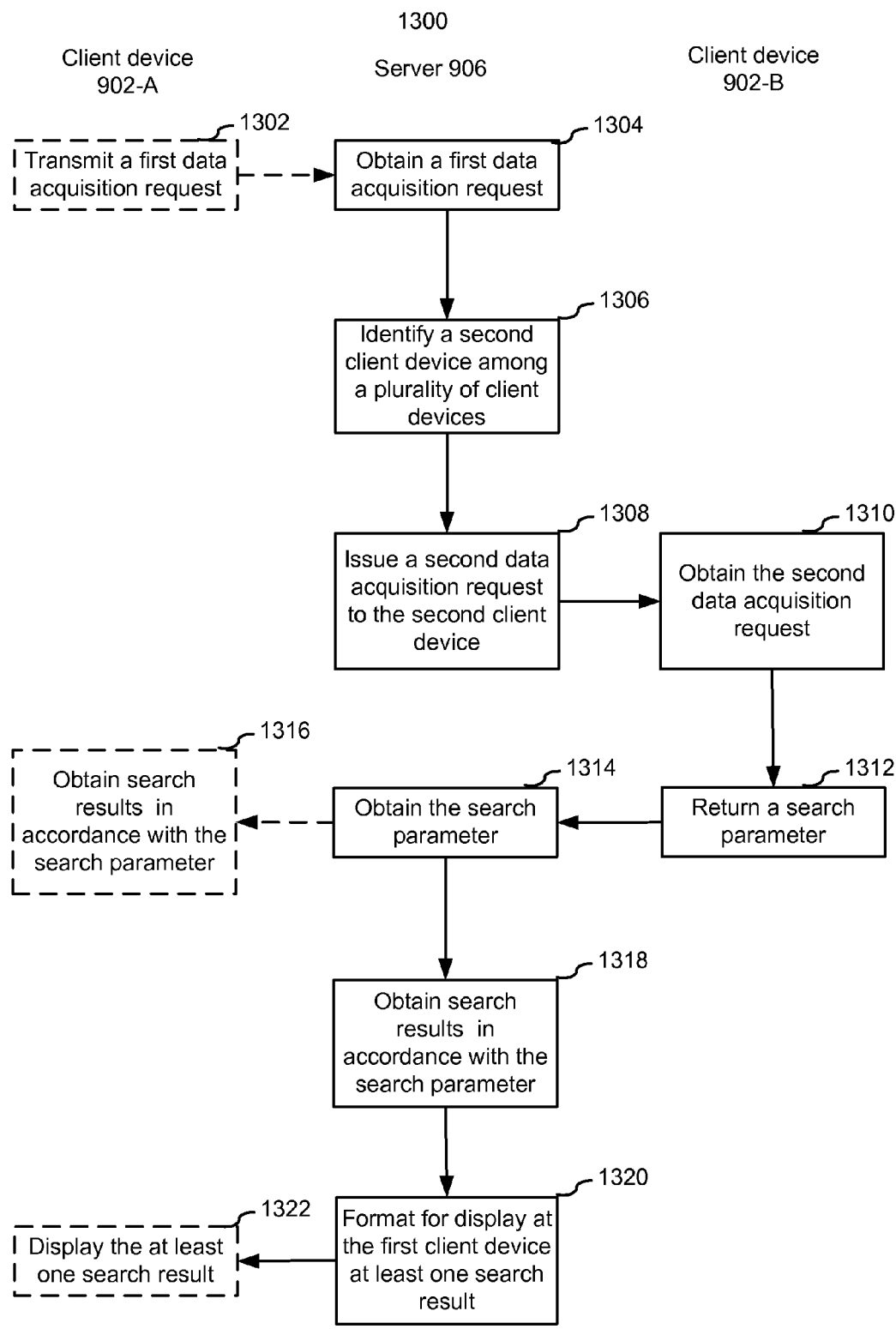
FIG. 13 is a flow chart illustrating a method for exchanging data between client devices, in a computer system, in accordance with some implementations.

FIG. 13 is a flow chart illustrating a method for exchanging data between client devices or client devices, in a computer system, in accordance with some implementations.

In some implementations, a first client device transmits (1302) a first data acquisition request to a server 906 (e.g., a cloud). In some implementations, after obtaining (1304) the first data acquisition request, the server 906 (e.g., the cloud) identifies (1304) a second client device (e.g., a smartphone), among a plurality of devices (e.g., all ATT smartphones), from which a search parameter (e.g., a location) necessary to or require for executing a search (e.g., a search of hotels within 4 miles of the location) is to be retrieved. In some implementations, to obtain the search parameter, the server 906 (e.g., the cloud) issues (1308) a second data acquisition request to the identified second client device.

In some implementations, the second client device obtains (1310) the second data acquisition request from the server 906 (e.g., the cloud), and returns (1312) the search parameter (e.g., the location) that was not previously available to but sought after by the server 906 (e.g., because neither the server 906 nor the first client device 902-A knew the location of the client device 902-B).

In some implementations, the server 906 then obtains the search parameter (1314) (e.g., the location of the client 902-B), and obtains search results (1318) in accordance there with. In other implementations, the server 906 transmits the search parameter (1314) to the first client device 902-A, which obtains (1316) the search results. In some implementations, search results are generating partly by the server 906 and partly by the first client device, e.g., so as to achieve load balancing.

In some implementations, the server 906 formats (1320) for display, at the first client device, at least one search result in the one or more search results. In some implementations, the at least one search result is then displayed (1322) at the first client device, for a user to review.

Figure 14A:
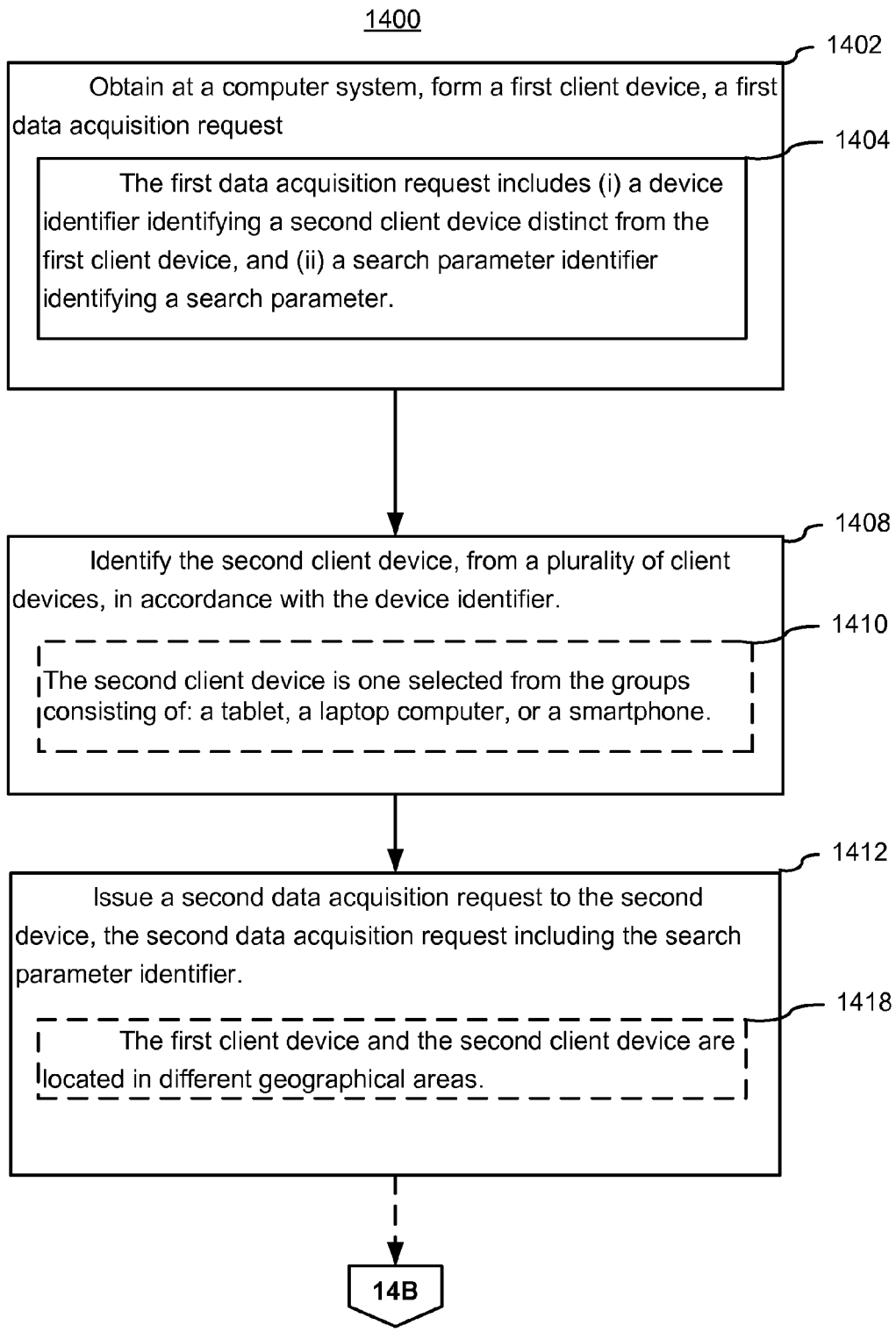
FIGS. 14A-14B are flow charts illustrating a method for exchanging data between client devices in a computer system, in accordance with some implementations.
Figure 14B:
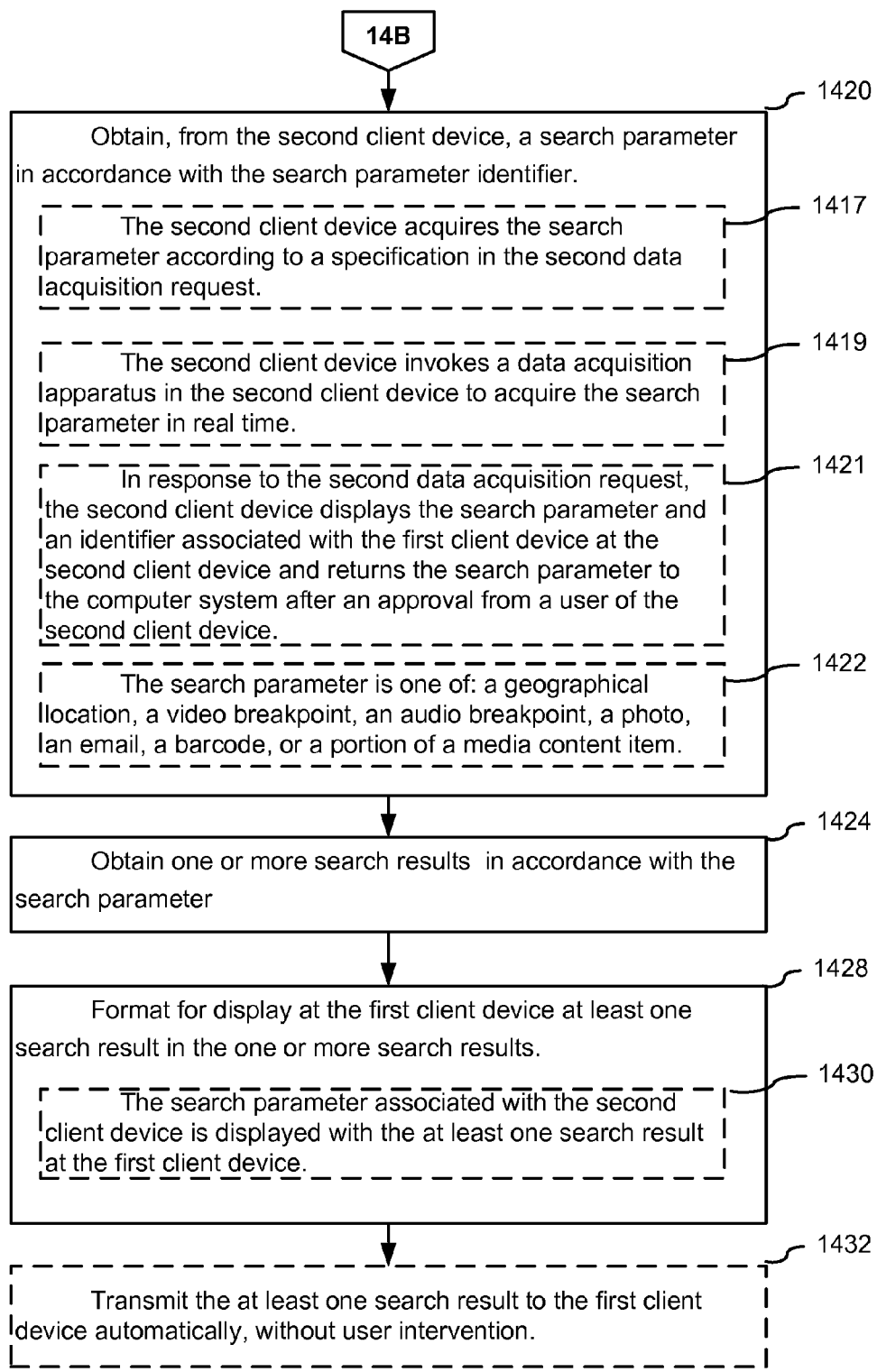

FIGS. 14A-14B are flow charts illustrating a method 1400 for exchanging data between client devices or client devices, implemented in a computer system (e.g., at a server or a cloud 906), in accordance with some implementations.

In some implementations, the computer system first obtains (1402), from a first client device (e.g., the client 902-A, such as a desktop computer), a first data acquisition request, such as a user request for hotel addresses. In some implementations, a data acquisition request is a search request, entered through a graphical user interface, such as a web application in a browser, or an interface for a software application that has a connection with the server or the cloud 906.

The first data acquisition request (e.g., the search request) includes (1404) (i) a device identifier identifying a second client device distinct from the first client device, and (ii) a search parameter identifier identifying a search parameter. For example, the search request for nearby hotel addresses includes (i) a phone number (e.g., "650-785-5985") and (ii) a string ("LOCATION") specifying that the location of a specific cell phone (the cell phone having number 650-785-5982) should be used as a search parameter for searching nearly hotel addresses. In some implementations, the computer system is a computing cloud or a portion thereof (e.g., a server within the cloud or a particular type of service offered by the cloud). For example, the computer system is a public or private computing cloud, such as an IaaS, a PaaS, an SaaS, an NaaS, a DaaS, or a DBaaS, or a portion thereof (e.g., a server within the cloud). In some implementations, access to the computing cloud is subscription based (e.g., fee-based) or free. In some implementations, the cloud is an IBM cloud, a DELL cloud, an Amazon cloud, an ORACLE cloud, or a Google cloud.

After obtaining the first data acquisition request, the computer system first identifies (1408) a second client device, from a plurality of client devices, in accordance with the device identifier. For example, after receiving the a search request from a user of a desktop computer, the cloud breaks down (e.g., analyzes or parses) the search request, and uses a device identifier (e.g., a phone number) included in the search request to identify a particular cell phone, among several cell phones or users associated therewith. Identifying a particular device among several devices is important, because, sometimes, a user is more interested in search results relevant to a particular device or its user. For example, a housewife looking for hotels for her husband who is on an out of town trip is more interested in knowing the location of her husband's cell phone (assuming the cell phone is with the husband), than knowing the locations of her children's cell phones.

In some implementations, the second client device is (1410) one selected from the group consisting of: a tablet, a laptop computer, a smartphone, a car radio, and a GPS device, such as an APPLE IPAD or IPHONE, a GOOGLE tablet, or a SAMSUNG cell phone. In some implementations, the second client device is a mobile or portable device (e.g., a cell phone or a handheld walkie-talkie); whereas the first client device is less (or not at all) mobile or portable—e.g., due to its size (which renders the first client device difficult or otherwise inconvenient to carry), or due to the way the first client device is connected with the cloud, such as via a cable or other wired connection, rather than via a wireless connection, such as a cell phone or a WIFI network). In some implementations, the first client device is a desktop computer, a cloud-enabled industrial printer, an intelligent home appliance (e.g., a kitchen stove, an air conditioner, a refrigerator, or a home security system).

After identifying the second client device, the computer system issues (1412) a second data acquisition request to the second device, the second data acquisition request including the search parameter identifier. For example, after receiving a request for hotels near location of a cell phone, the cloud send a request to the cell phone to obtain its location.

In some implementations, the first client device and the second client device are not directly connected. For example, the client 902-A is a desktop computer that is connected to the communication network 904 (e.g., the cloud) via a cable line, an ADSL line, or a phone line, but is not directly connected with the client 902-B, which is a cell phone remotely located from the client 902-A. In some implementations, the first client device and the second client device are connected through only the computer system (e.g., the cloud). In some implementations, there is no direct connection between the client device 902-A, and the client device 902-B, e.g., because the client devices 902-A and 902-B share no connection capacity in common. For example, the client 902-A is a desktop computer without a Bluetooth adaptor; while the client 902-B is a Bluetooth-enabled tablet.

In other implementations, although the client 902-A and the client 902-B are connected through one or more connections (e.g., via the cloud, as well as via a data cable, a WIFI, a Bluetooth, and an infrared connection), a threshold amount (e.g., 90%) or a predefined type (e.g., confidential information) of data transmission between the client 902-A and the client 902-B takes place through the server 106 (or the cloud), e.g., as so to provide enhanced security (e.g., when the cloud automatically creates backup for incoming and outgoing data) or to protect confidentiality (e.g., when the cloud is equipped with and applies advanced encryption/decryption algorithms to incoming and outgoing data).

In some implementations, the first client device and the second client device are located in different geographical areas (1418). For example, the client 902-A is a desktop computer located in Palo Alto, Calif., whereas the client 902-B is another desktop computer located in New York, N.Y. For example, the client 902-A is a printer located in a premier law firm's Houston, Tex. office, while the client 902-B is a web-camera located in the same law firm's Los Angeles, Calif. office. In some implementations, the server 906, or the cloud, provides a connection between the client 902-A and the client 902-B that satisfies a set of predefined user requirements (e.g., connection speed, pricing, stability, performance, and security).

After issuing the second data acquisition request to the second client device, the computer system (e.g. the server 906 or the cloud) obtains (1420) from the second client device, a search parameter in accordance with the search parameter identifier. In some implementations, the second client device acquires (1417) the search parameter according to a specification in the second data acquisition request. For example, in response to a user request to obtain location of the second client device, the cloud obtains the location (e.g., name of a town, a city, a county or a state) from the second client device. In response to the second data acquisition request, the second client device invokes (1419) a data acquisition apparatus in the second client device to acquire the search parameter in real time. For example, the second client device (e.g., a smartphone) may include a GPS module for determining the current location of the second client device. For another example, in response to a user request to obtain a breakpoint of a video (e.g., an indicator as to which portion of the video a user has not watched by a user) from the second client device (e.g., an Internet-enabled DVD player), the cloud obtains the breakpoint (e.g., the minute and second of a DVD video, where the user most recently quit watching) from the second client device. In yet another example, a person, who watches an on-line video from his/her smartphone on the way home, would like to switch the play of video to another device at home (e.g., a desktop that has a wired access to the Internet) because, e.g., the device at home may play the video with a better resolution and audio quality. In this case, the device at home sends a request for a breakpoint of the video to a remote server. The remote server then sends a request to the smartphone for information associated with the video being played on the smartphone (e.g., the breakpoint at which the person stops playing the video). Based on the information returned by the smartphone, the remote server determines a starting point for playing the video and returns the starting point to the device at home. Using the starting point, the device at home can restart the play of the video. In some implementations, the remote server or the device at home may automatically roll back the starting point from the breakpoint by a predefined amount of time (e.g., 10 seconds) to improve the continuity of the person's video viewing experience.

In some implementations, the search parameter specifies (1422) one of the followings: a geographical location, a video breakpoint, an audio breakpoint, a photo, an email, a barcode, or a portion of a media content item. For example, the search parameter (e.g., a breakpoint) specifies where a user has left off watching a video, listing to an audio, looking at an electronic photo album (e.g., a Yahoo FLICKR album). In another example, the search parameter (e.g., an "unread" message flag) indicates which emails in an email stream or an email box a user has not reviewed. These approaches are advantageous: they enable a user to resume where the same or another user stopped most recently, thereby improving efficiency and enhancing viewing experience (e.g., when watching a video).

As noted above, to protect the privacy of the user of the second client device, the second client device may include a mechanism seeking the user's approval before releasing any sensitive information including, e.g., the current location of the second client device or the application currently running on the second client device. In response to the second data acquisition request, the second client device displays (1421) the search parameter and an identifier associated with the first client device (e.g., the name of the user of the first client device included in the first data acquisition request initiated by the user) at the second client device and returns the search parameter to the computer system after an approval from a user of the second client device.

In some implementations, the computer system (e.g. the server 906 or the cloud) then obtains (1424) one or more search results in accordance with the search parameter. In some implementations, the computer system (e.g. the cloud) generates the one or more search results by executing a search query using the search parameter 905 against the search database 922. In other implementations, the client 902-B, when equipped with appropriate processing power, generates the one or more search results (e.g., by executing a search query suing the search parameter 905 against the search database 922 shown in FIG. 9 or against another database resident on or connected with the client 902-B).

In some implementations, after obtaining the one or more search results, the computer system (e.g. the server 906 or the cloud) formats (1428) for display, at the first client device, at least one search result in the one or more search results. In some implementations, the computer system (e.g. the cloud) applies one or more filtering criteria to the one or more search results, and selectively transmits the filtered search results to the first client device, e.g., so as to conserve bandwidth (e.g., when the connection between the first client and the cloud is an ADSL connection); or to avoid overloading the first client device when the first client device (e.g. a ten-year old desktop with an INTEL 486 processor) has limited processing power to handle more than a predefined number (e.g., 20, 50, 100, or 200) of search results. In some implementations, the one or more filtering criteria include pricing information (e.g., more than 50 dollars per night for an overnight hotel stay), availability (e.g., hotel rooms for a specified date or time), user preference (e.g., reservations at a four-star hotel, at a motel, or at a bed and breakfast accommodation), location constraint (e.g., within a predefined distance), time constraint (e.g., a check-in time requirement), and facility constraint (e.g., with or without a swimming pool). In some implementations, the search parameter associated with the second client device (e.g., its location information) is displayed (1430) with the at least one search result at the first client device.

In some implementations, the computer system automatically transmits the search result to the first client device without user intervention, e.g., so as not to require user efforts (additional to the first data acquisition request). These approaches are advantageous, because they reduce burden on a user, both mentally and physically. A user of the first client device only needs to specify which search parameter is to be selected from which device, and the search results in accordance therewith are then automatically provided to the user, thereby improving search efficiency and user friendliness.

In some implementations, the search parameter associated with the second client device (e.g., its location information) is displayed (1430) with the at least one search result at the first client device. In some implementations, the user of the second client device and the first client device is the same person. While receiving data on the second client device from the computer system, the user initiates the first data acquisition request from the first client device in order to continue receiving data on the first client device from the computer system. For example, while a user watches a video using her smartphone on her way home, the user may like to continue watching the same video but move from the smartphone that has a small screen and a slow data download speed to a desktop computer that has a large screen and a fast data download speed once at home. In this case, the user can send a request to migrate the play of the video from the smartphone to the desktop. But instead of replaying the video from the beginning, the desktop continues the play of the video based on the breakpoint information provided by the smartphone. Sometimes, the desktop may automatically roll back a few seconds from the breakpoint to improve the continuity of the play of the video stream.

Descriptions above are merely exemplary implementations of the present application rather than limiting the present application in any form. Although the present application is disclosed in detail above with reference to the exemplary implementations, the present application is not limited thereto. Any person of ordinary skill in the art may, without departing from the scope of the technical solutions of the present application, make some changes or modifications to the technical contents disclosed above to form equivalent implementations with equal changes. Any profile modification, equal change, or modification made to the implementations above according to the technical essence of the present application without departing from the content of the technical solutions of the present application shall all belong to the scope of the technical solutions of the present application.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first client device could be termed second client device, and, similarly, second client device could be termed first client device, without departing from the scope of the present application.

First client device and second client device are both client devices, but they are not the same client device.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method performed at a computer server having a processor and memory for storing one or more programs to be executed by the processor for exchanging data between two client devices, comprising:

obtaining, from a first client device, a first data acquisition request, wherein the first data acquisition request includes (i) a device identifier identifying a second client device distinct from the first client device, (ii) a search parameter identifier identifying a type of the search parameter whose value is to be provided by the second client device, and (iii) a search keyword;

identifying the second client device, from a plurality of client devices, in accordance with the device identifier;

issuing a second data acquisition request to the second client device, the second data acquisition request including the search parameter identifier;

obtaining, from the second client device, the search parameter in accordance with the search parameter identifier, wherein second client device determines the value of the search parameter based on the type of the search parameter;

obtaining one or more search results from a third device in accordance with the search parameter from the second client device and the search keyword from the first client device; and providing at least one search result in the one or more search results to the first client device for display to a user of the first client device.

2. The method of claim 1, wherein the value of the search parameter is uniquely associated with and determined by the second client device in real time and is displayed with the at least one search result at the first client device.

3. The method of claim 1, wherein, in response to the second data acquisition request, the second client device displays the search parameter and an identifier associated with the first client device at the second client device and returns the search parameter to the computer server after an approval from a user of the second client device.

4. The method of claim 1, wherein the second client device acquires the search parameter according to a specification in the second data acquisition request.

5. The method of claim 1, wherein, in response to the second data acquisition request, the second client device invokes a data acquisition apparatus in the second client device to acquire the search parameter in real time.

6. The method of claim 1, wherein the first client device and the second client device are located in different geographical areas.

7. The method of claim 1, further comprising: transmitting the at least one search result to the first client device automatically, without user intervention.

8. The method of claim 1, wherein the search parameter is one selected from the group consisting of: a geographical location, a video breakpoint, an audio breakpoint, a photo, an email, a barcode, and a portion of a media content item.

9. The method of claim 1, wherein the second client device is one selected from the group consisting of: a tablet, a laptop computer, and a smartphone.

10. The method of claim 1, wherein, while receiving data on the second client device from the computer server, the computer server receives the first data acquisition request from the first client device initiated by the user in order to continue receiving data on the first client device from the computer server.

11. A computer server, comprising:

one or more processors;

memory; and one or more programs, wherein the one or more programs are stored in the memory and configured to be executed by the one or more processors, the one or more programs including instructions for:

obtaining, from a first client device, a first data acquisition request, wherein the first data acquisition request includes (i) a device identifier identifying a second client device distinct from the first client device, (ii) a search parameter identifier identifying a type of the search parameter whose value is to be provided by the second client device, and (iii) a search keyword;

identifying the second client device, from a plurality of client devices, in accordance with the device identifier;

issuing a second data acquisition request to the second device, the second data acquisition request including the search parameter identifier;

obtaining, from the second client device, a search parameter in accordance with the search parameter identifier, wherein the second client device determines the value of the search parameter based on the type of the search parameter;

obtaining one or more search results from a third device in accordance with the search parameter from the second client device and the search keyword from the first client device; and providing at least one search result in the one or more search results to the first client device for display to a user of the first client device.

12. The computer server of claim 11, wherein the value of the search parameter is uniquely associated with and determined by the second client device in real time and is displayed with the at least one search result at the first client device.

13. The computer server of claim 11, wherein the second client device acquires the search parameter according to a specification in the second data acquisition request.

14. The computer server of claim 11, wherein the first client device and the second client device are located in different geographical areas.

15. The computer server of claim 11, wherein the instructions further includes instruction for transmitting the at least one search result to the first client device automatically, without user intervention.

16. The computer server of claim 11, wherein the search parameter is one selected from the group consisting of: a geographical location, a video breakpoint, an audio breakpoint, a photo, an email, a barcode, and a portion of a media content item.

17. The computer server of claim 11, wherein the second client device is one selected from the group consisting of: a tablet, a laptop computer, and a smartphone.

18. A non-transitory computer readable storage medium storing one or more programs, the one or more programs comprising instructions, which when executed by a computer server with one or more processors, cause the computer server to:

obtain, from a first client device, a first data acquisition request, wherein the first data acquisition request includes (i) a device identifier identifying a second client device distinct from the first client device, (ii) a search parameter identifier identifying a type of the search parameter whose value is to be provided by the second client device, and (iii) a search keyword;

identify the second client device, from a plurality of client devices, in accordance with the device identifier;

issue a second data acquisition request to the second device, the second data acquisition request including the search parameter identifier;

obtain, from the second client device, a search parameter in accordance with the search parameter identifier, wherein the second client device determines the value of the search parameter based on the type of the search parameter;

obtain one or more search results from a third device in accordance with the search parameter from the second client device and the search keyword from the first client device; and format for display at the first client device at least one search result in the one or more search results.

19. The non-transitory computer readable storage medium of claim 18, wherein the value of the search parameter is uniquely associated with and determined by the second client device in real time and is displayed with the at least one search result at the first client device.

20. The non-transitory computer readable storage medium of claim 18, wherein the search parameter is one selected from the group consisting of: a geographical location, a video breakpoint, an audio breakpoint, a photo, an email, a barcode, and a portion of a media content item.

* * * * *